Oct. 9, 1951 — F. E. LEE — 2,570,958

LINED DRAWER

Filed Sept. 18, 1948

INVENTOR.
FRANCIS E. LEE
BY
ATTORNEYS

Patented Oct. 9, 1951

2,570,958

UNITED STATES PATENT OFFICE 2,570,958

LINED DRAWER

Francis E. Lee, Abington, Pa.

Application September 18, 1948, Serial No. 49,977

2 Claims. (Cl. 217—3)

This invention relates to a receptacle and more particularly to a receptacle of the relatively shallow tray or drawer type.

An object of this invention is to provide a strong receptacle which may be made with rapidity and at low cost.

A further object of this invention is to provide a strong receptacle which may be readily cleaned either with or without the use of a solvent.

A still further object of this invention is to provide a strong receptacle having an interior resistant to corrosive substances.

In general, the invention involves a receptacle having upstanding support members bonded to a molded body having one or more layers of fabric impregnated with a synthetic thermoplastic or thermosetting resin and, where an exceptionally strong bottom is required, a reinforcing layer which may be, for example, a layer of veneer, plywood, fiber board or gun fiber board (Masonite).

The fabric may be made, for example, of cotton, rayon, wool or fiberglass, and, if more than one layer is employed, a combination of fabrics may be employed.

It is intended that a bat be embraced within the meaning of "felt," which term is used in this sense henceforth in the description and in the claims.

More specifically, where the receptacle has only a single layer of fabric, it is preferred to use a fine fiber felt. A fine fiber cotton, wool or rayon felt is satisfactory. The felts may be of the type having a smooth surface and loosely matted fibers below the surfaces such as are commonly used in filters and for protecting glass in transit or they may be of the type having loosely matted fibers throughout.

When the receptacle has more than one layer, one of the above mentioned fine fiber felts is preferably used to form the interior layer of the receptacle to give a smooth finish to the interior of the receptacle. A coarse fabric which may be either felted or woven is preferably used to form the additional layers. The coarse fabric may be made of any suitable material such as, for example, fiberglass, rayon, wool or cotton but will preferably be made of fiberglass.

Thermosetting synthetic resins which may be used to impregnate the fabrics are, for example, phenol formaldehyde, urea formaldehyde or polyester thermosetting resins such as ethylene glycol maleate in admixture with styrene. Examples of thermoplastic synthetic resins which may be used in accordance with this invention are cellulose acetate, methyl methacrylate, polystyrene, and vinyl acetate. The resins may have a pigment admixed therewith. A filler such as, for example, walnut shell flour or fine talc may also be mixed with the resins.

The resin impregnated fabric or fabrics may be molded into the desired form and bonded to the support members by the use of heat and pressure in a manner well known to the art.

The advantages of such construction are numerous. Cost of production is lowered and speed of production is greatly increased. Both of these advantages result principally from the fact that the labor in producing a receptacle in accordance with this invention is markedly less than the labor requisite to produce the conventional receptacle.

The receptacle, in accordance with this invention, is particularly adapted for use in laboratories and other such locations where corrosive material is likely to come in contact with the interior of the receptacle. Since the interior of the receptacle is waterproof, it may be readily washed out and quickly dried. Further, the construction of the receptacle facilitates its cleaning by dusting.

Figure 1:
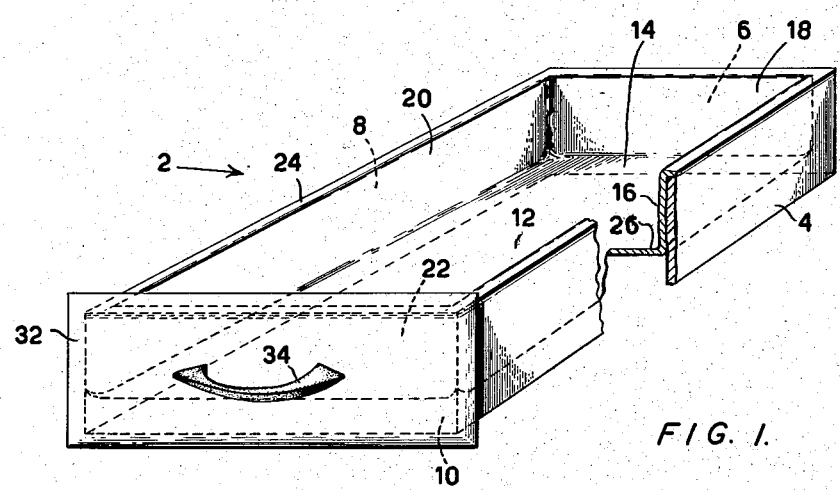
Figure 1 is a front perspective view of a drawer with a portion broken away taken on a plane parallel to a plane passing through one end of a drawer.

As shown in Figure 1, a drawer 2 has vertical members 4, 6, 8 and 10. These members are preferably made of wood, but, of course, may be made of any suitable material, such as, for example, metal, compressed fiber board or thermosetting resins. The members 4, 6, 8 and 10 form a frame within which the body of the drawer is molded and to which it is molded as will appear hereinafter.

A molded body 12 has a bottom 14, sides 16, 18, 20 and 22 and a flange 24. Body 12 is a fine fiber felt 26 impregnated with resin and is molded about the vertical members 4, 6, 8 and 10 by the use of heat and pressure and conventional and well known techniques. Thus body sides 16, 18, 20 and 22 are tightly bonded to vertical members 4, 6, 8 and 10, and, similarly, flange 24 is bonded to the tops of the vertical members. The molded body acts to secure the vertical members together thus eliminating the necessity for using fastening means such as nails and screws or forming the ends of the vertical members so that they will interlock.

In order to complete the drawer, a front panel 32 having a handle 34 may be secured to member 10 by any suitable method, such as, for example, by gluing.

Figure 2:
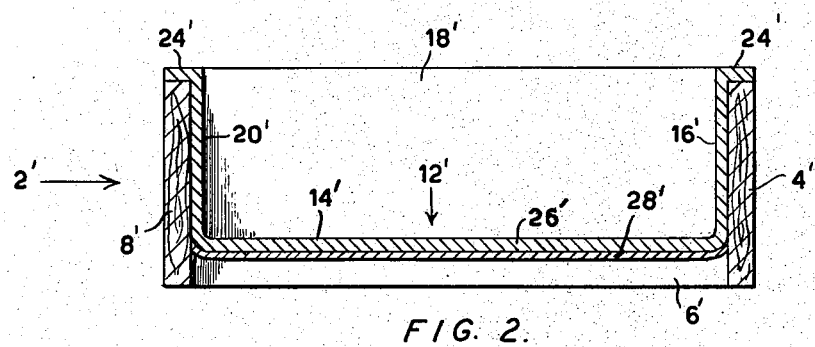
Figure 2 is a vertical section through a drawer showing a modified structure and taken on a plane parallel to a plane passing through one end of a drawer.
Figure 3:
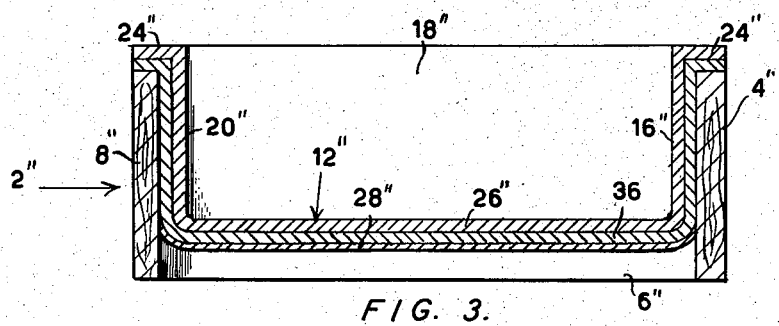
Figure 3 is a vertical section through a drawer showing an additional modified structure and taken on a plane parallel to a plane passing through one end of a drawer.

A drawer similar to the drawer of Figure 1, except for the construction of the bottom, may be made, as shown in Figure 2, where the receptacle is to be used for the storage of relatively heavy items. Such a drawer 2' may have a body 12' comprising a layer of fine fiber felt 26' and a reinforcing layer 28' which acts to strengthen the bottom 14'. Fabric 26' is impregnated with a thermosetting or thermoplastic resin as in the embodiment of Figure 1 and the body 12' is formed by molding under heat and pressure in a conventional manner. Body sides 16', 18' and 20' and flange 24' are shown bonded to vertical members 4', 6', and 8'. It will be noted that the reinforcing layer 28' is rounded upwardly at its sides and fits tightly against the support members. Fabric 26' and the reinforcing layer 28' are bonded together by the resin.

Where a stronger receptacle is desired, the construction in accordance with this invention, as shown in Figure 3, may be utilized. Here a drawer 2", similar in shape to the drawer shown in Figure 1, has a molded body 12" comprising a layer of fine fiber 26" and a layer of coarse fiber fabric 36. Additionally, the bottom has a reinforcing layer of veneer 28". Layer 28", as shown in Figure 3, carries over to upstanding members 4" and 8" and partially up the side of body 12". A flange 24" is bonded to the top of the upstanding members. The fabric layers are impregnated with a thermoplastic or thermosetting resin and each layer is bonded to the adjacent layer.

As shown in the Figures 1 through 3, all angular portions of the interior are rounded out in the molding process to facilitate cleaning the receptacle.

It should be noted that the embodiments of the invention described above are merely illustrative and not limiting except as set forth in the following claims.

What I claim and desire to protect by Letters Patent is:

1. A drawer comprising side and end members arranged in substantially right angled relationship, the side and end members being of the same heighth and one member having a front panel secured thereto, said panel being of greater heighth and longer than the end members and a molded body bonded to said side and end members and forming the interior and bottom of the drawer, the bottom of the molded body being positioned above the bottoms of said side and end members and said molded body comprising a fine fiber felt impregnated with a resin.

2. A drawer comprising side and end members arranged in substantially right angled relationship, the side and end members being of the same height and one end member having a front panel secured thereto, a handle secured to said front panel and a molded body bonded to said side and end members and forming the interior and bottom of the drawer, the bottom of the molded body being positioned above the bottoms of said side and end members and said molded body comprising a fine fiber felt impregnated with a resin.

FRANCIS E. LEE.

REFERENCES CITED

The following references are of record in the file of this patent:

UNITED STATES PATENTS

| Number | Name | Date |
|---|---|---|
| 1,715,935 | Lundgren | June 4, 1929 |
| 2,042,210 | Clay | May 26, 1936 |
| 2,051,960 | McCaskell | Aug. 25, 1936 |
| 2,274,095 | Sawyer | Feb. 24, 1942 |